(12) United States Patent
Miyazaki

(10) Patent No.: US 7,717,566 B2
(45) Date of Patent: May 18, 2010

(54) LIGHT SOURCE AND PROJECTOR EMPLOYING LIGHT SOURCE

(75) Inventor: Takeshi Miyazaki, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 448 days.

(21) Appl. No.: 11/891,698

(22) Filed: Aug. 13, 2007

(65) Prior Publication Data
US 2008/0088801 A1    Apr. 17, 2008

(30) Foreign Application Priority Data
Aug. 25, 2006    (JP) ............... 2006-228519

(51) Int. Cl.
*G03B 21/14*    (2006.01)
(52) U.S. Cl. ............. 353/33; 353/81; 353/94; 349/8; 359/834; 362/231
(58) Field of Classification Search .......... 353/31, 353/33, 34, 37, 81, 94; 349/5, 7, 8, 9; 359/634, 359/833, 834; 362/231, 234
See application file for complete search history.

(56) References Cited
U.S. PATENT DOCUMENTS
6,411,449 B1 *  6/2002  Hashizume et al. ......... 359/831
6,882,379 B1    4/2005  Yokoyama et al.

(Continued)

FOREIGN PATENT DOCUMENTS
JP       07-175029 A    7/1995

(Continued)

OTHER PUBLICATIONS
Japanese Office Action (and English translation thereof) dated Sep. 18, 2008, issued in a counterpart Japanese Application.

*Primary Examiner*—William C Dowling
(74) *Attorney, Agent, or Firm*—Frishauf, Holtz, Goodman & Chick, P.C.

(57) ABSTRACT

The invention was made to provide a light source unit which can enhance the utilization efficiency of the dichroic prism which emits light that is emitted from a plurality of light sources in a direction which is parallel to an optical axis and a projector which employs the light source. The light source unit has a first light source, a second light source and a third light source which have different colors and includes a substantially cubical dichroic prism which combines light from the respective light sources for emission thereof. One of surfaces which intersect an optical axis of the dichroic prism is made to constitute a first incident surface, a surface which faces the first incident surface is made to constitute an emitting surface, and side surfaces are made to constitute a second incident surface and a third incident surface, respectively. The first light source is disposed in the vicinity of the first incident surface, the second light source is disposed in the vicinity of the second incident surface, and the third light source is disposed in the vicinity of the third incident surface, and the first incident surface, the second incident surface and the third incident surface are made up of filters which let light from the first light source, the second light source and the third light source pass through and reflect light of all other colors.

8 Claims, 5 Drawing Sheets

U.S. PATENT DOCUMENTS

| | | | |
|---|---|---|---|
| 7,126,652 B2 | 10/2006 | Yokoyama et al. | |
| 7,144,121 B2 * | 12/2006 | Minano et al. | 353/94 |
| 7,270,425 B2 * | 9/2007 | Arai et al. | 353/87 |
| 7,293,880 B2 * | 11/2007 | Sakata et al. | 353/94 |
| 7,311,403 B2 * | 12/2007 | Yoshii et al. | 353/31 |
| 7,360,900 B2 * | 4/2008 | Sakata et al. | 353/20 |
| 7,575,340 B2 * | 8/2009 | Kung et al. | 362/231 |
| 2007/0253197 A1 * | 11/2007 | Kung et al. | 362/231 |
| 2007/0268692 A1 * | 11/2007 | Chen et al. | 362/231 |
| 2009/0284965 A1 * | 11/2009 | Zheng et al. | 362/231 |

FOREIGN PATENT DOCUMENTS

| | | |
|---|---|---|
| JP | 2003-005286 A | 1/2003 |
| JP | 2003-5286 A | 1/2003 |

\* cited by examiner

LIGHT SOURCE AND PROJECTOR EMPLOYING LIGHT SOURCE

BACKGROUND OF THE INVENTION

The present invention relates to a light source unit which utilizes light emitting diodes and a projector which utilizes the light source unit.

Currently, in many cases, video projectors are used as an image projection unit for projecting an image on a screen of a personal computer, a video image and the like on to a screen.

The projectors of this type utilize many extra-high pressure mercy vapor lamps or metal halide lamps which have high luminance. With these light emitting units, however, there has been an inherent problem caused by their large heat values that a cooling mechanism has to be complex in construction and is made large in size. To cope with this problem, there have been proposed light sources for small projectors which utilize light emitting diodes which have relatively small heat values.

For example, Japanese Unexamined Patent Publication No. 2003-5286 proposes an invention relating to a light source unit for a projector in which a plurality of light emitting diodes are provided in parallel for respective colors so as to produce light sources for red, blue and green light, and these light sources are arranged in such a manner as to face three sides of a dichroic prism, respectively, so that light rays in respective colors are combined together to produce a while light ray.

In the light source unit employing the dichroic prism that has been described above, however, light that has entered in the interior of the dichroic prism is diffused and dispersed to become stray light, and in some cases, the stray light is allowed to leak out. This constitutes a problem that the utilization efficiency of light is decreased.

The invention has been made in view of these situations and an aspect thereof is to provide a light source unit which can enhance the utilization efficiency of the dichroic prism which emits light that is emitted from the plurality of light sources in a direction which is parallel to an optical axis and a projector which employs the light source.

SUMMARY OF THE INVENTION

According to a preferred aspect of the invention, there is provided a light source unit including a plurality of light sources of different wavelengths and a dichroic prism, wherein the dichroic prism is formed substantially into a cubical shape which has a plurality of incident surfaces which correspond to the plurality of light sources, respectively, and an emitting surface so as to combine light rays from the respective light sources for emission therefrom, and wherein filters are formed on two of the incident surfaces which do not face the emitting surface of the dichroic prism which filters let in light of wavelengths corresponding, respectively, to the light sources which the filters face pass through and reflect light of all other wavelengths.

Furthermore, according to another preferred aspect of the invention, there is provided a projector including a light source unit, a light source side optical system, a display device, a projection side optical system, a cooling fan, a lamp power supply circuit and a projector control unit, wherein the light source unit includes a plurality of light sources of different wavelengths and a dichroic prism, wherein the dichroic prism is formed substantially into a cubical shape which has a plurality of incident surfaces which correspond to the plurality of light sources, respectively, and an emitting surface so as to combine light rays from the respective light sources for emission therefrom, and wherein filters are formed on two of the incident surfaces which do not face the emitting surface of the dichroic prism which filters let in light of wavelengths corresponding, respectively, to the light sources which the filter faces pass through and reflect light of all other wavelengths.

DESCRIPTION OF THE PREFERRED EMBODIMENT

Figure 1:
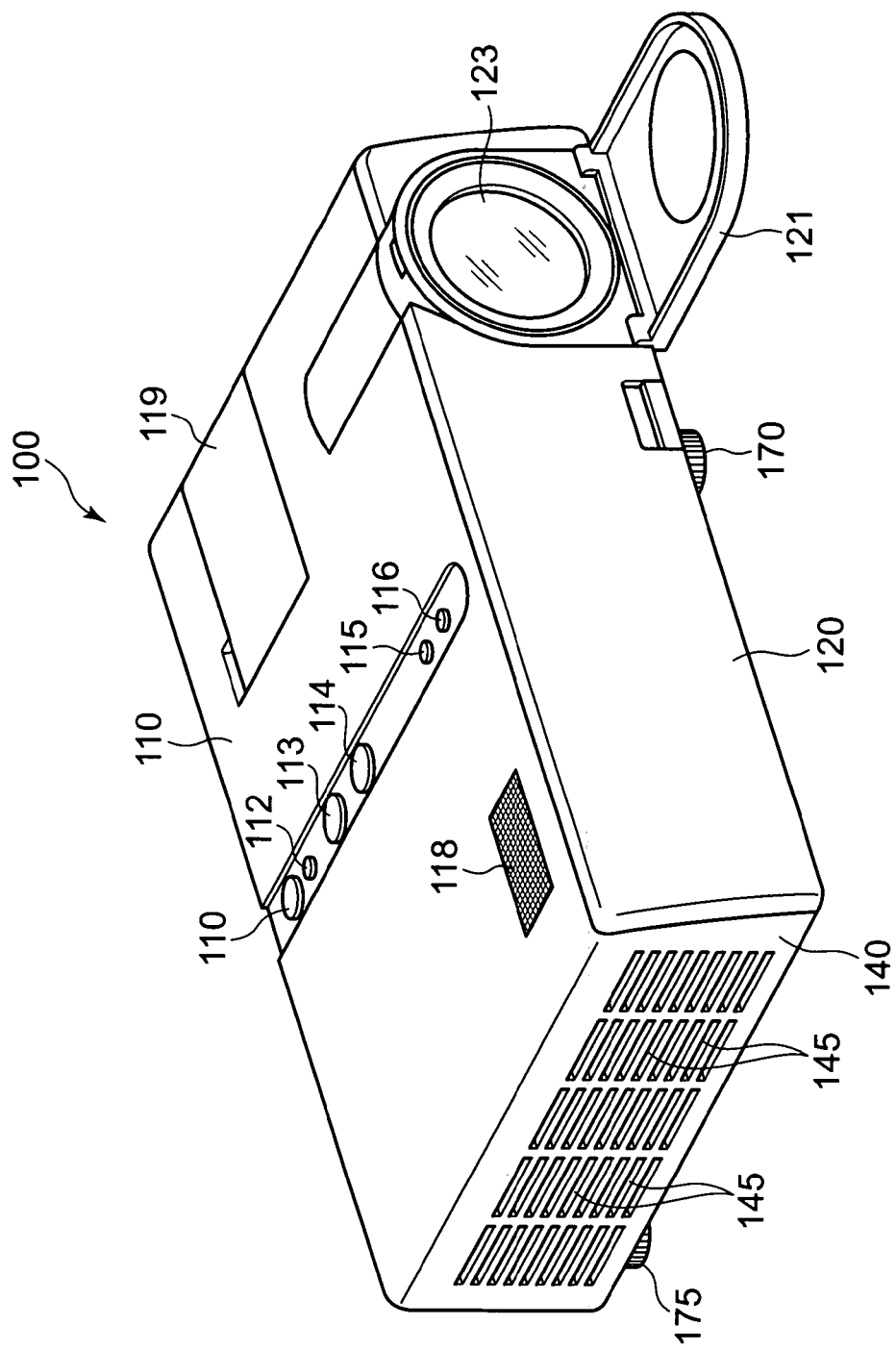
FIG. 1 is a perspective view of a projector according to an embodiment of the invention.

A projector 100 according to a best mode for carrying out the invention includes a light source unit 210, a light source side optical system 220, a display device 230, a projection side optical system 250, a cooling fan 190, a lamp power supply circuit 187 and a projector control unit 181.

In addition, the light source unit 210 includes a first light source, a second light source and a third light source, which are a plurality of light sources of different wavelengths, and a dichroic prism 70 which is formed substantially into a cubical shape which has a plurality of incident surfaces which correspond to the respective light sources and an emitting surface 74 so as to combine light rays from the respective light sources for emission therefrom.

Additionally, as to the incident surfaces of the dichroic prism 70, a surface which intersects the optical axis is made to constitute a first incident surface 71, side surfaces which are parallel to the optical axis are made to constitute a second incident surface 72 and a third incident surface 73, respectively, and the emitting surface 74 is made to constitute a surface which faces the first incident surface 71. Then, the first light source is disposed in the vicinity of the first incident surface 71, the second light source in the vicinity of the second incident surface 72, and the third light source in the vicinity of the third incident surface 73.

Furthermore, filters are formed on two of the incident surfaces which do not face the emitting surface 74 of the dichroic prism 70 which filters let light of wavelengths corresponding, respectively, to the light sources which the filter faces pass through and reflect light of all other wavelengths. Namely, a filter is formed on the first incident surface 71 which filter lets light from the first light source pass through and reflects light of all other wavelengths, a filter is formed on the second incident surface 72 which filter lets light from the second light source pass through and reflects light of all other wavelengths, and a filter is formed on the third incident surface 73 which filter lets light from the third light source pass through and reflects light of all other wavelengths.

In addition, the respective light sources are made up, respectively, of a red, blue and green light emitting diode, and the plurality of light emitting diodes are arranged on a plane. In the dichroic prism 70, mirror surfaces are formed on other surfaces than the incident surfaces and the emitting surface 74 in such a manner as to be oriented towards the interior of the dichroic prism 70. Namely, reflection mirrors are formed on an upper surface 75 and a lower surface 76 of the dichroic prism 70 which reflection mirrors reflect all light rays incident thereon.

Hereinafter, the invention will be described based on the accompanying drawings. A projector 100 according to the invention incorporates therein a microcomputer as a projector control unit, and as is shown in FIG. 1, has a projection opening 123 provided with a lens cover 121 in a front surface panel 120 of a case which is formed substantially into a rectangular parallelepiped shape. In addition, the projector 100 has on an upper surface panel 110 thereof keys and indicators which include, in addition to a power supply key, which is a power supply switch 111, a manual image quality adjusting key 113, an automatic image quality adjusting key 114, a power supply lamp indicator 112, a light source lamp indicator 115 and an overheat indicator 116, as well as a speaker hole 118 in which a speaker is disposed and an opening and closing lid 119. Furthermore, the projector 100 has on a back surface panel, not shown, a power supply connector port, an USB terminal port for connection to a personal computer, and various types of signal input terminal ports which include image signal input video terminal and mini D-sub terminal ports.

Figure 2:
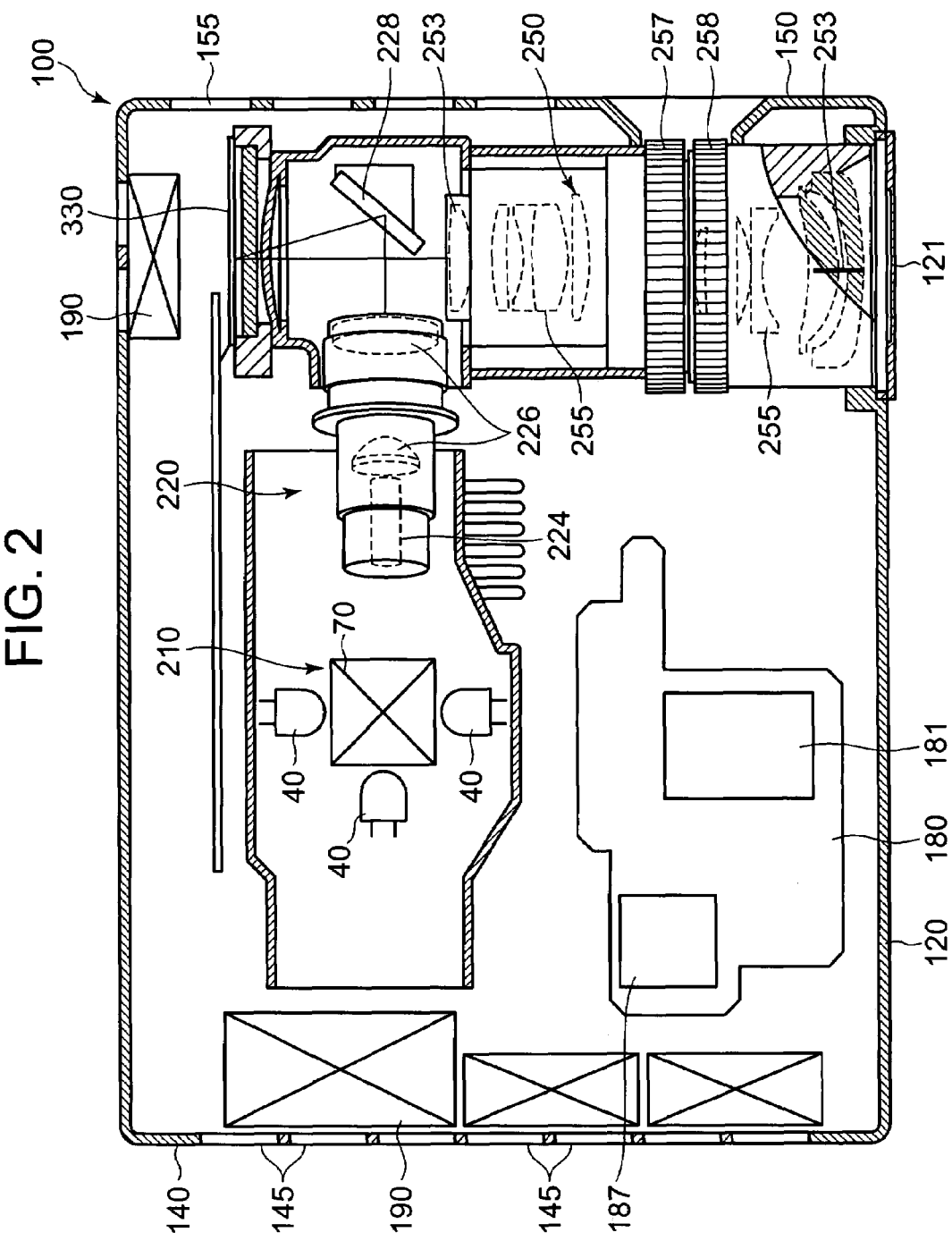
FIG. 2 is a plan view of the projector according to the invention with an upper surface panel removed.

In addition, the projector 100 has inside the opening and closing lid 119 sub-keys for fine adjustment of image and image quality and setting various types of operations of the projector 100. Furthermore, as is shown in FIG. 2, the projector 100 has air intake openings 155 which are provided in a left-hand side surface panel 150 and air discharge openings 145 which are provided in a right-hand side surface panel 140 of the case, as well as a cooling fan 190 which is disposed in the interior of the case. Moreover, a left-hand side surface panel 150 has a zoom control ring 257 which changes the size of a projection image and a focus control ring 258 which adjusts the focus of a projection image.

In addition, the projector 100 has a front leg member 170 which is adjustable in protrusion and is provided at the front of the bottom surface panel and rear leg members 175 which are fixed and are provided in left- and right-side positions at the rear of the bottom surface panel, whereby the height of the projector 100 is changed at the front by adjusting the protrusion of a front leg member 170, so as to enable the projection of an image according to the height of a screen.

As is shown in FIG. 2, the projector 100 has in the interior thereof a light source unit 210 and, as a light source side optical system 220, a light smoothing or guiding unit 224, a plurality of light source side lens groups 226 and a mirror 228.

Furthermore, incorporated in the projector 100 are a circuit board 180 on which a lamp power supply circuit 187 and a projector control unit 181 are mounted, the light source side optical system 220 which shines light emitted from the light source unit 210 on to a display device 230, the display device 230 in which a plurality of pixels are arranged in row and column directions into a matrix configuration for displaying an image by controlling the reflection of light that has entered, and a fixed lens group 253 and a movable lens group 255 which make up a projection side optical system 250 which projects light emitted from the display device 230 on to a projection surface such as a screen.

In addition, the display device 230 is a display device 230 which includes no means for coloring incident light, and in this embodiment, a micromirror display device is employed which is generally referred to as a DMD (Digital Micromirror Device). This display device 230 is such as to display an image by reflecting light which is incident from an incident direction which is inclined towards one direction relative to a forward direction thereof into on-state light rays which are directed forwards and off-state light rays which are inclined obliquely by switching tilting directions of a plurality of micromirrors. Namely, light rays which are incident on micromirrors which are tilted in one tilting direction are reflected forwards as on-state light rays by the micromirrors and light rays which are incident on micromirrors which are tilted in the other tilting direction are reflected in an oblique direction as off-state light rays by the micromirrors, the off-state light rays being then made to be absorbed by a light absorbing plate, whereby an image is formed by a bright display resulting from the reflection of light in the forward direction and a dark display resulting from the reflection of light in the oblique direction.

Figure 3:
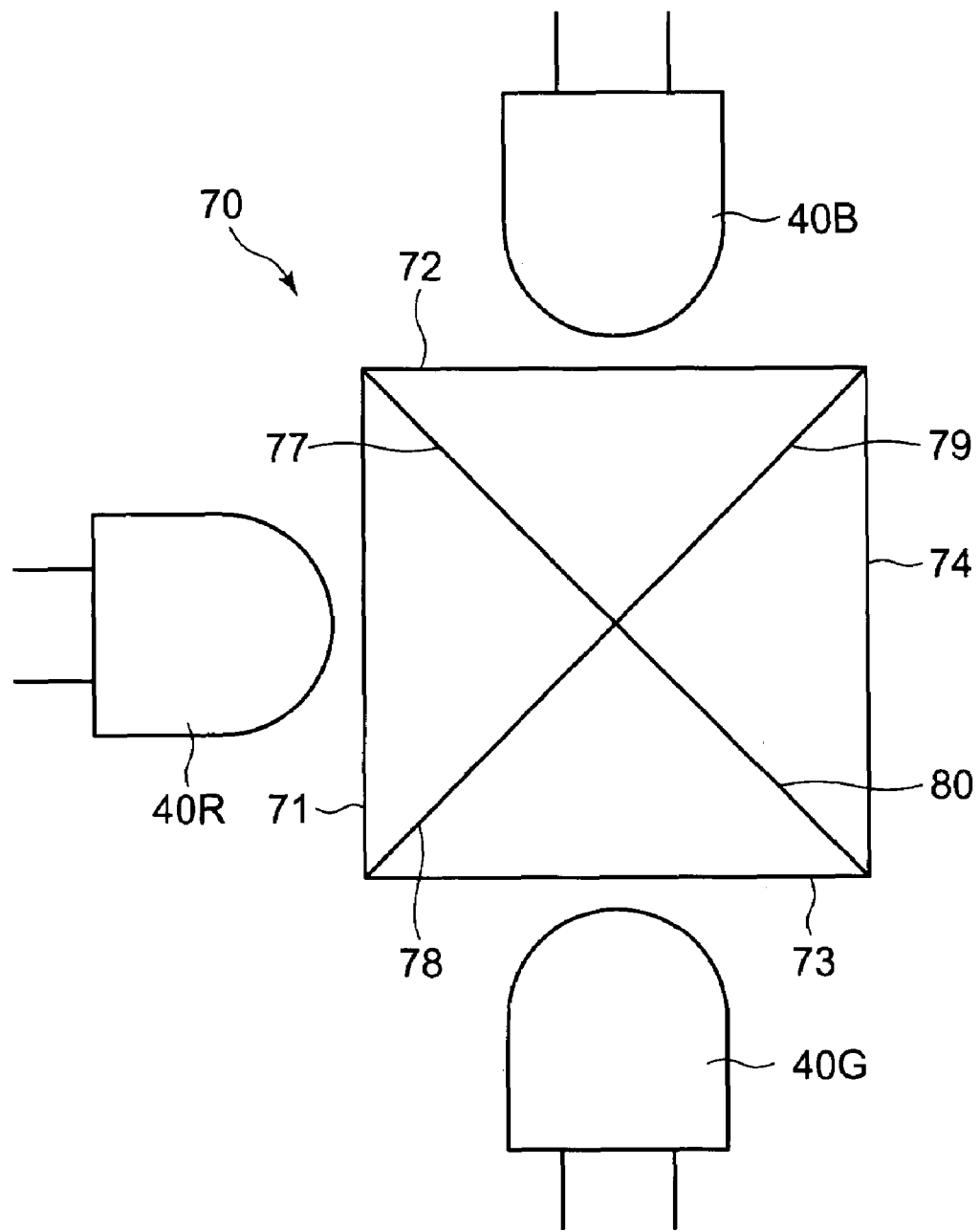
FIG. 3 is a horizontal sectional view of a light source unit according to the embodiment of the invention.
Figure 4:
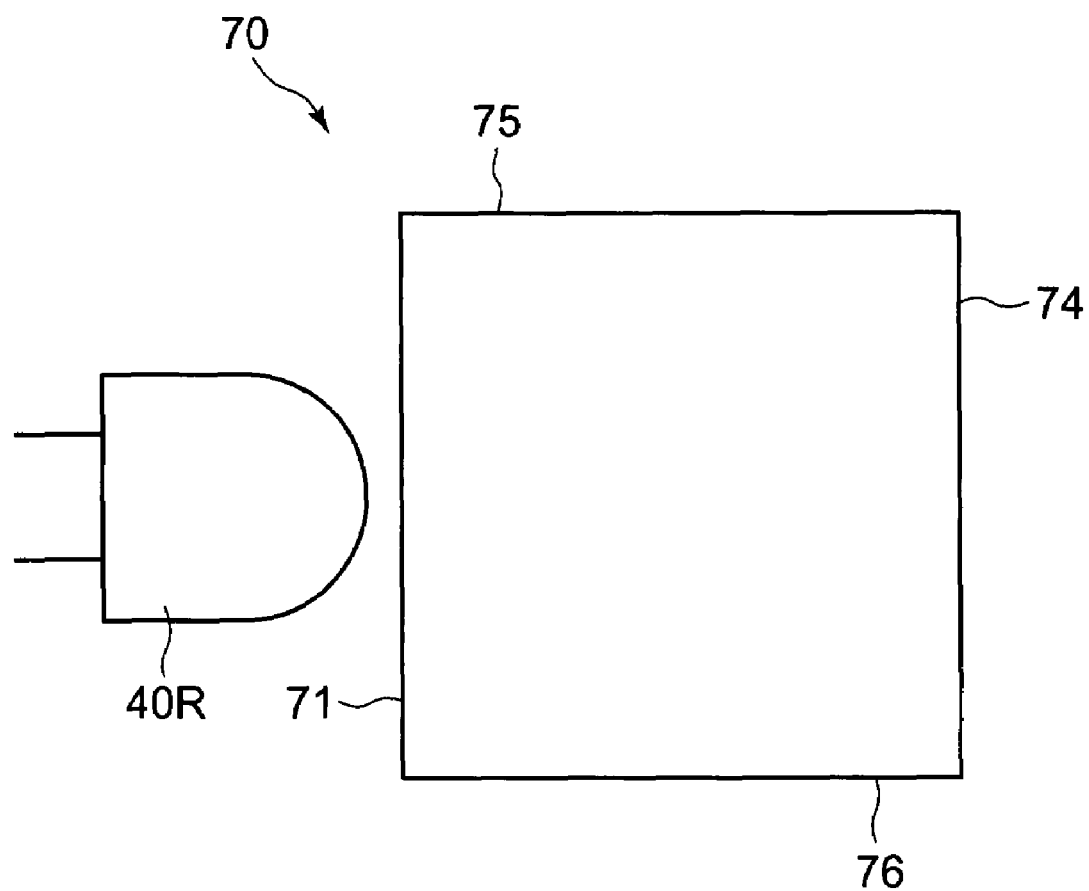
FIG. 4 is a vertical sectional view of the light source unit according to the embodiment of the invention.

As is shown in FIGS. 3 and 4, the light source unit 210 adopts a configuration in which light sources 40 are disposed in three directions of the dichroic prism 70. The light sources 40 are made up of a first light source, a second light source and a third light source which are made up, in turn, of a red light emitting diode group 40R, a blue light emitting diode group 40B and a green light emitting diode group 40G, respectively, and the light emitting diode groups of the respective colors are controlled in illumination or light emission through time sharing control by the projector control unit 181.

In addition, in this embodiment, although the first light source is described as the red light emitting diode group 40R, the second light source as the blue light emitting diode group 40B and the third light source as the green light emitting diode group 40G, the invention is, of course, not limited thereto. In addition, the light emitting diode group is made up by arranging a plurality of light emitting diodes into a planar configuration, so as to increase the luminance.

Although a light emitting diode having a peak light emission wavelength of 620 nm is used for the red light emitting diode, a light emitting diode having a peak light emission wavelength of 470 nm for the blue light emitting diode and a light emitting diode having a peak light emission wavelength of 555 nm for the green light emitting diode, light emitting diodes of other types can, of course, be used. In addition, when letting light pass through, the filters let in light of wavelengths which are in the vicinity of these predetermined wavelengths, and when reflecting it, the filters reflect light of wavelengths which are in the vicinity of these predetermined wavelengths.

In addition, the dichroic prism 70 is formed into a rectangular parallelepiped shape or cubical shape by combining together respective vertexes of four rectangular equilateral triangular prisms, whereby light rays entering the prism from three surfaces are emitted from the remaining surface, which is an emitting surface 74.

Namely, this dichroic prism 70 has a first incident surface 71, a second incident surface 72, a third incident surface 73 and the emitting surface 74, and the first light source is disposed in the vicinity of the first incident surface 71, the second light source is disposed in the second incident surface 72 and the third light source is disposed in the third incident surface 73. The first incident surface 71 is made up of a filter which let in only light from the first light source pass through and reflects light of all other colors, the second incident surface 72 is made up of a filter which let in only light from the second light source pass through and reflects light of all other colors, and the third incident surface 73 is made up of a filter which let in only light from the third light source pass through and reflects light of all other colors.

Then, the red light emitting diode group 40R is disposed in the vicinity of a surface of the dichroic prism 70 which faces the emitting surface 74, so that the surface is made to constitute the first incident surface 71, and the blue light emitting diode group 40B and the green light emitting diode group 40G are disposed, respectively, in the vicinity of side surfaces which constitute two facing surfaces of the dichroic prism 70 which neighbor the first incident surface in such a manner as to intersect it at right angles, so that the side surface lying in the vicinity of the blue light emitting diode group 40B is made to constitute the second incident surface 72, and the side surface lying in the vicinity of the green light emitting diode group 40G is made to constitute the third incident surface 73. In addition, an upper side surface and a lower side surface of the dichroic prism 70 are made to constitute an upper surface 75 and a lower surface 76, respectively.

Since this first incident surface 71 is a surface through which red light emitted from the red light emitting diode group 40R is allowed to enter the dichroic prism 70, the filter is formed thereon which transmits only red light.

In addition, since the second incident surface 72 is a surface through which blue light emitted from the blue light emitting diode group 40B is allowed to enter the dichroic prism 70, the filter is formed thereon which transmits only blue light and reflects red light which is partially shone on to the inside of the second incident surface 72.

Additionally, similarly, the filter is formed on the third incident surface 73 which transmits green light and reflects red light.

Since the emitting surface 74 needs to emit all light within the dichroic prism 70, no filter is designed to be formed thereon. In some cases, a light transmission filter, which transmits all light, is, of course, formed on the emitting surface 74 for protection thereof.

In addition, a first diagonal surface 77, which is a diagonal surface extending from a corner where the first incident surface 71 and the second incident surface 72 of the dichroic prism 70 meet each other to the center of the dichroic prism, is such as to reflect blue light and transmit light in all other colors, and because of this, a filter is formed on this surface which reflects only blue light.

Additionally, a second diagonal surface 78, which is a diagonal surface extending from a corner where the first incident surface 71 and the third incident surface 73 of the dichroic prism 70 meet each other to the center of the dichroic prism, is such as to reflect only green light and transmit light in all other colors, and because of this, a filter is formed on this surface which reflects only green light.

Furthermore, a third diagonal surface 79, which is a diagonal surface extending from a corner where the second incident surface 72 and the emitting surface 74 of the dichroic prism 70 meet each other to the center of the dichroic prism, is, as with the second diagonal surface 78, such as to reflect only green light and transmit light in all other colors, and because of this, a filter is formed on this surface which reflects only green light. In addition, a fourth diagonal surface 80, which is a diagonal surface extending from a corner where the third incident surface 73 and the emitting surface 74 of the dichroic prism 70 meet each other to the center of the dichroic prism is, as with the first diagonal surface 77, such as to reflect blue light and transmit light in all other colors, and because of this, a filter is formed on this surface which reflects only blue light.

A reflection mirror, which reflects all light within the dichroic prism 70, is formed on the upper surface 75 and the lower surface 76 which are surfaces other than the incident surfaces 71, 72, 73 and the emitting surface of the dichroic prism 70.

In addition, the light source side optical system 220, which makes light emitted from the light source unit 210 enter the display device 230 is made up of the light guiding unit 224 and the light source lens group 226 which is made up of a plurality of lens elements, and the mirror 228.

The light guiding unit 224 of the light source side optical system 220 is disposed in a position where an incident surface thereof lies on an emitting side of the dichroic prism 70, whereby light that enters from an incident opening is emitted from an emitting opening thereof as a light ray in which the intensity of light is uniformly distributed across the width thereof.

In addition, the mirror 228 is such as to reflect light that has been emitted from the light source unit 210 to pass through the light guiding unit 224 and the light source side lens group 226 towards the display device 230 to thereby project light on to the display device 230 from a direction which is tilted to one direction relative to the forward direction of the display device 230.

The projection side optical system 250 includes a fixed lens barrel which incorporates therein the fixed lens group 253 and a movable lens barrel which incorporates therein the movable lens group 255 and which is in engagement with the fixed lens barrel and is adapted to move back and forth by being operated rotationally, so as to make up a zoom lens by combination of a plurality of lens elements which are built in the respective lens barrels.

Then, the projector control unit 181, which is made up of the microcomputer, is provided on the circuit board 180 shown in FIG. 2, whereby operations of respective circuits within the projector are controlled by this projector control unit 181, so that the time sharing illumination or light emission of the light sources 40 of the respective colors is controlled according to image data and the display device 230 is also controlled. Furthermore, the projector control unit 181 drives the cooling fan 190 at rated speeds which match the configuration and arrangement of blades of the cooling fan 190, whereby outside air is taken in from the air intake openings 155 in the left-hand side panel 150 and inside air is discharged from the air discharge openings 145 in the right-hand side panel 140.

In this way, the projector 100 functions such that the light source 40 of the light source unit 210 is made to illuminate or emit light in the time sharing fashion, light so emitted is then combined together by the dichroic prism 70 so as to be emitted therefrom in one direction, the intensity of the light so emitted is made to be distributed uniformly across the width thereof by the light guiding 224 of the light source side optical system 220, and the smoothed light is then projected towards the display device 230 by the light source side lens group 226, which functions as the light source side optical system 220, and the mirror 228.

Then, by writing mono-color image data of the respective colors sequentially on to the display device 230 in synchronism with the cycle of the time sharing light emission of the light source 40, mono-color images of the respective colors are made to formed sequentially on the display device 230 by on-state light rays which are reflected forwards of the display device 230, and mono-color image beams of the respective colors which are emitted sequentially from the display device 230 are projected on to a projection plane in an enlarged fashion by the lens groups 253, 255 of the projection side optical system 250, whereby a full-color image made up of three superposed mono-color images of the respective colors is displayed on the projection plane.

According to the embodiment, the filters are formed on the first incident surface 71, the second incident surface 72 and the third incident surface 73 of the dichroic prism 70 which filters let in light of the predetermined colors pass through and reflect light of all other colors, and the reflection mirrors which reflect all light are formed on the upper surface 75 and the bottom surface 76 of the dichroic prism 70, whereby light of the predetermined wavelengths is allowed to enter the interior of the dichroic prism 70 from the respective surfaces thereof, and the light that has so entered the dichroic prism 70 leaks out in no case from any other surfaces than the emitting surface 74, the light utilization efficiency being thereby enhanced, so as to provide an image with high luminance. In addition, a configuration may be adopted in which only a filter which reflects red light is formed on the second incident surface 72 and the third incident surface 73 with no limitation on light passing therethrough.

Next, a modified example of the invention will be described. While in the embodiment that has been described heretofore, the upper surface 75 and the lower surface 76 of the dichroic prism 70 are made up of the reflection mirrors, in a modified example, in order to eliminate a difference in luminance among the respective colors, the upper surface 75 and the lower surface 76 may be made up of a filter which lets part of light of a color whose luminance is high pass through and reflects light of a color whose luminance is low.

In this way, by making up the surface 75 and the lower surface 76 of the dichroic prism 70 of the filter which lets part of light of a color whose luminance is high pass through and reflects light of a color whose luminance is low, a difference in luminance among the respective colors of the projection images can be eliminated, thereby making it possible to provide a clear projection image.

Figure 5:
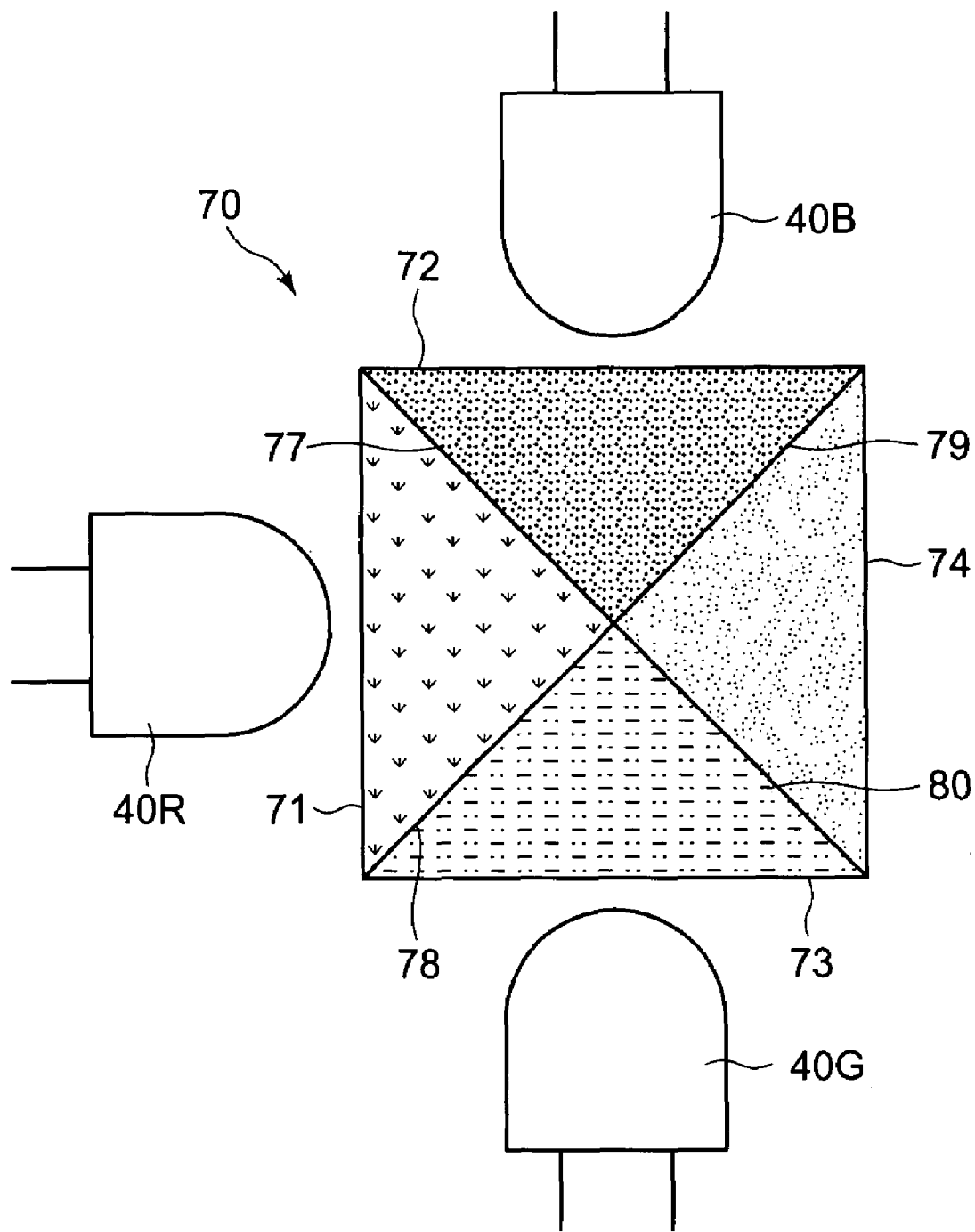
FIG. 5 is a horizontal sectional view of a light source unit according to a modified example made to the embodiment of the invention.

Furthermore, as is shown in FIG. 5, the filters formed on the upper surface 75 and the lower surface 76 of the dichroic prism 70 can be divided such that a surface which is made up of the emitting surface 74 and an upper portion and a lower portion of the third diagonal surface 79 and the fourth diagonal surface 80 is made up of a reflection mirrors which reflect all light, a surface which is made up of the first incident surface 71 and an upper portion and a lower portion of the first diagonal surface 77 and the second diagonal surface 78 is made up of a filter which reflects only red light, a surface which is made up of the second incident surface 72 and an upper portion and a lower portion of the first diagonal surface 77 and the third diagonal surface 79 is made up of a filter which reflects only blue light, and a surface which is made up of the third incident surface 73 and an upper portion and a lower portion of the second diagonal surface 78 and the fourth diagonal surface 80 is made up of a filter which reflects only green light.

In this way, by making up the portions of the upper surface 75 and the lower surface 76 which lie in the respective incident surfaces of the dichroic prism 70 as the filter which reflects light which is incident on the incident surfaces and making up portions of the upper and lower surfaces which lie in the vicinity of the emitting surface 74 of the reflection filter which is made up of the combination of the filter and the reflection mirror, the luminance can be made uniform, thereby making it possible to provide a clear projection image.

The invention is not limited to the case where the reflection filter is formed which lets only red, green and blue light pass through and reflects other colors or reflects all colors, and in a case where a light emitting diode is used whose luminance is lower in comparison to those of other colors, the reflection filter may be formed on surfaces of an upper portion and a lower portion which lie in the vicinity of an incident surface which faces the light emitting diode whose luminance is low, and it will suffice in case filters which reflect light of predetermined colors are formed in required locations.

In addition, in the embodiment and the modified example that have been described heretofore, the locations where the light emitting diodes are disposed can be changed freely, and while the light emitting diodes are described as being grouped into the light emitting diode groups, in case a light emitting diode having high luminance is employed, only a single light emitting diode can be provided for each color, and furthermore, by changing the number of light emitting diodes to be disposed color by color, the uniformity in luminance can be realized.

Furthermore, in the embodiment and the modified example that have been described heretofore, for the sake of simplicity, the first incident surface 71 may not be provided with the filter but may be made into the same construction as that of the emitting surface 74. In addition, the upper surface 75 and the lower surface 76 of the dichroic prism 70 do not have to be made up of the reflection mirrors which reflect all light. Furthermore, the surface which is made up of the first incident surface 71 and the upper portion and the lower portion of the first diagonal surface 77 and the second diagonal surface 78 does not have to be made up of the filter which reflects only red light.

In addition, the invention is not limited to the embodiment that has been described herein but can be modified and/or improved freely without departing from the spirit and scope of the invention.

What is claimed is:

1. A light source unit comprising:
    a plurality of light sources of different wavelengths; and
    a dichroic prism which is formed substantially into a cubical shape which has a plurality of incident surfaces which correspond to the plurality of light sources, respectively, and an emitting surface so as to combine light rays from the respective light sources for emission therefrom,
    wherein filters are formed on the incident surfaces which do not face the emitting surface of the dichroic prism,
    wherein the filters let light of wavelengths corresponding, respectively, to the light sources which the filters face pass through and reflect light of all other wavelengths, and
    wherein a reflection filter which reflects light of a predetermined color to a required location or a mirror surface which reflects light in such a manner as to be oriented towards an interior of the dichroic prism is formed on surfaces other than the incident surfaces and the emitting surface of the dichroic prism.

2. A light source unit as set forth in claim 1, wherein the respective light sources are red, blue, and green light emitting diodes.

3. A light source unit comprising:
    a plurality of light sources of different wavelengths; and
    a dichroic prism which is formed substantially into a cubical shape which has a plurality of incident surfaces which correspond to the plurality of light sources, respectively, and an emitting surface so as to combine light rays from the respective light sources for emission therefrom,
    wherein filters are formed on the incident surfaces which do not face the emitting surface of the dichroic prism,
    wherein the filters let light of wavelengths corresponding, respectively, to the light sources which the filters face pass through and reflect light of all other wavelengths, and
    wherein a surface other than the incident surfaces and the emitting surface of the dichroic prism is made up of a combination of a reflection filter which reflects light of a predetermined color and a reflection mirror which reflects all light.

4. A light source unit as set forth in claim 3, wherein the respective light sources are red, blue, and green light emitting diodes.

5. A projector comprising;
a light source unit;
a light source side optical system;
a display device;
a projection side optical system;
a cooling fan;
a lamp power supply circuit; and
a projector control unit,
wherein the light source unit comprises:
a plurality of light sources of different wavelengths; and
a dichroic prism which is formed substantially into a cubical shape which has a plurality of incident surfaces which correspond to the plurality of light sources, respectively, and an emitting surface so as to combine light rays from the respective light sources for emission therefrom,
wherein filters are formed on the incident surfaces which do not face the emitting surface of the dichroic prism, wherein the filters let light of wavelengths corresponding, respectively, to the light sources which the filters face pass through and reflect light of all other wavelengths, and
wherein a reflection filter which reflects light of a predetermined color to a required location or a mirror surface which reflects light in such a manner as to be oriented towards an interior of the dichroic prism is formed on surfaces other than the incident surfaces and the emitting surface of the dichroic prism.

6. A projector as set forth in claim 5, wherein the respective light sources are red, blue, and green light emitting diodes.

7. A projector comprising;
a light source unit;
a light source side optical system;
a display device;
a projection side optical system;
a cooling fan;
a lamp power supply circuit; and
a projector control unit,
wherein the light source unit comprises:
a plurality of light sources of different wavelengths; and
a dichroic prism which is formed substantially into a cubical shape which has a plurality of incident surfaces which correspond to the plurality of light sources, respectively, and an emitting surface so as to combine light rays from the respective light sources for emission therefrom,
wherein filters are formed on the incident surfaces which do not face the emitting surface of the dichroic prism, wherein the filters let light of wavelengths corresponding, respectively, to the light sources which the filters face pass through and reflect light of all other wavelengths, and
wherein a surface other than the incident surfaces and the emitting surface of the dichroic prism is made up of a combination of a reflection filter which reflects light of a predetermined color and a reflection mirror which reflects all light.

8. A projector as set forth in claim 7, wherein the respective light sources are red, blue, and green light emitting diodes.

* * * * *